United States Patent
Yamamoto et al.

(10) Patent No.: US 11,592,107 B2
(45) Date of Patent: Feb. 28, 2023

(54) GASKET

(71) Applicants: UCHIYAMA MANUFACTURING CORP., Okayama (JP); TOYOTA JIDOSHA KABUSHIKI KAISHA, Aichi-ken (JP)

(72) Inventors: Keita Yamamoto, Okayama (JP); Takefumi Tanaka, Okayama (JP); Ryusuke Baba, Aichi-ken (JP)

(73) Assignees: UCHIYAMA MANUFACTURING CORP., Okayama (JP); TOYOTA JIDOSH KABUSHIKI KAISHA, Aichi-ken (JP)

( * ) Notice: Subject to any disclaimer, the term of this patent is extended or adjusted under 35 U.S.C. 154(b) by 327 days.

(21) Appl. No.: 16/568,739

(22) Filed: Sep. 12, 2019

(65) Prior Publication Data

US 2020/0080640 A1 Mar. 12, 2020

(30) Foreign Application Priority Data

Sep. 12, 2018 (JP) .............................. JP2018-170569

(51) Int. Cl.
*F16J 15/10* (2006.01)
(52) U.S. Cl.
CPC .................................. *F16J 15/104* (2013.01)
(58) Field of Classification Search
CPC .................................. F16L 21/02; F16J 15/104
See application file for complete search history.

(56) References Cited

U.S. PATENT DOCUMENTS

| | | | | |
|---|---|---|---|---|
| 3,165,324 A | * | 1/1965 | Zopfi | F16L 21/02 277/615 |
| 5,106,127 A | * | 4/1992 | Brief | F16L 37/38 285/110 |
| 10,544,884 B2 | * | 1/2020 | Beele | F16L 5/10 |
| 2003/0047942 A1 | * | 3/2003 | Yasuda | F16L 21/02 285/252 |
| 2009/0072494 A1 | * | 3/2009 | Smith | F16L 25/14 277/625 |
| 2016/0377206 A1 | * | 12/2016 | Hepguvendik | F16J 15/14 277/314 |

(Continued)

FOREIGN PATENT DOCUMENTS

| | | |
|---|---|---|
| CN | 205654870 U | 10/2016 |
| DE | 2402022 A1 | 9/1974 |

(Continued)

*Primary Examiner* — Eugene G Byrd
(74) *Attorney, Agent, or Firm* — Muncy, Geissler, Olds & Lowe, P.C.

(57) ABSTRACT

A gasket for sealing a gap between a through hole formed on a wall body and a pipe to be inserted into the through hole, the gasket being provided for the pipe and made of tubular elastic material, the gasket having an inner circumferential lip portion which elastically contacts an outer circumferential face of the pipe; and an outer circumferential lip portion which elastically contacts an inner circumferential face of the through hole; an inner seal area on an inner circumferential side where the inner circumferential lip portion is provided is located at a position so that the inner seal area does not overlap in a radial direction with an outer seal area of an outer circumferential side where the outer circumferential lip portion is provided.

19 Claims, 6 Drawing Sheets

(56) References Cited

U.S. PATENT DOCUMENTS

2019/0032783 A1* 1/2019 Yanagi ................. F16J 15/3236
2019/0203837 A1* 7/2019 Cann ...................... F16J 15/104

FOREIGN PATENT DOCUMENTS

| EP | 0435720 A1 | | 7/1991 | |
|----|------------|---|--------|---|
| EP | 1186846 A1 | | 3/2002 | |
| FR | 2220035 A1 | | 9/1974 | |
| JP | S48-094011 U | | 11/1973 | |
| JP | 57-169887 | | 10/1982 | |
| JP | H06165347 A | | 6/1994 | |
| JP | 08105577 A | * | 4/1996 | ............. F16L 21/02 |
| JP | 2000329491 A | | 11/2000 | |
| JP | 2015227701 A | | 12/2015 | |
| JP | 6318044 B2 | | 4/2018 | |

* cited by examiner

GASKET

BACKGROUND OF THE INVENTION

Field of the Invention

The present invention relates to a gasket for sealing a space between a through hole formed on a wall body and a pipe to be inserted into the through hole, the gasket being provided for the pipe and being made of tubular elastic material.

Description of the Related Art

For example in an inverter for an automobile, an internal pipe which flows a cooling medium inside an inverter case is incorporated; and the internal pipe is connected with an outer pipe which is connected with a converter via a through hole formed on a wall body of the inverter case. Patent Literature 1 mentioned below proposes a connecting member for sealing a space between the through hole formed on the wall body of the inverter case and the outer pipe inserted into the through hole.

Patent Literature 1 discloses the connecting member having a plurality of inner and outer lips which elastically contact the outer circumferential face of the pipe and the inner circumferential face of the through hole.

CITATION LIST

Patent Literature

PTL 1: Japanese Unexamined Patent Application Publication No. 2015-227701

SUMMARY OF THE INVENTION

Problems to be Solved by the Invention

The axial centers of the pipe and the through hole mentioned above are sometimes misaligned due to vibration, feature of pipe material, the position of fastening, an assembling method and so on; even when the above misalignment occurs, it is required to inhibit influence of the misalignment on the seal contact pressure of the inner and outer lip portions and to keep sealing a space between the through hole and the pipe. The above-mentioned connection member is required to have the inner and outer lip portions, to keep sealing ability, and to have convenience for insertion and assembly.

The present invention is proposed in view of the above-mentioned problems and has an object to provide a gasket capable of inhibiting influence of the eccentricity on the seal contact pressure, of reducing insertion load, and of easy assembling.

Means of Solving the Problems

A gasket proposed in order to solve the above-mentioned object seals a gap between a through hole formed on a wall body and a pipe to be inserted into the through hole, the gasket being provided for the pipe and made of tubular elastic material; the gasket has an inner circumferential lip portion which elastically contacts an outer circumferential face of the pipe and an outer circumferential lip portion which elastically contacts an inner circumferential face of the through hole; an inner seal area on an inner circumferential side where the inner circumferential lip portion is provided is located at a position so that the inner seal area does not overlap in a radial direction with an outer seal area of an outer circumferential side where the outer circumferential lip portion is provided.

Effects of the Invention

Constructed as mentioned above, the pipe connection structure and the connection member in one aspect of the present invention are able to inhibit adverse influence of the eccentricity on the seal contact pressure, reduce insertion load, and have good assembling ability.

DESCRIPTION OF THE EMBODIMENTS

Figure 1:
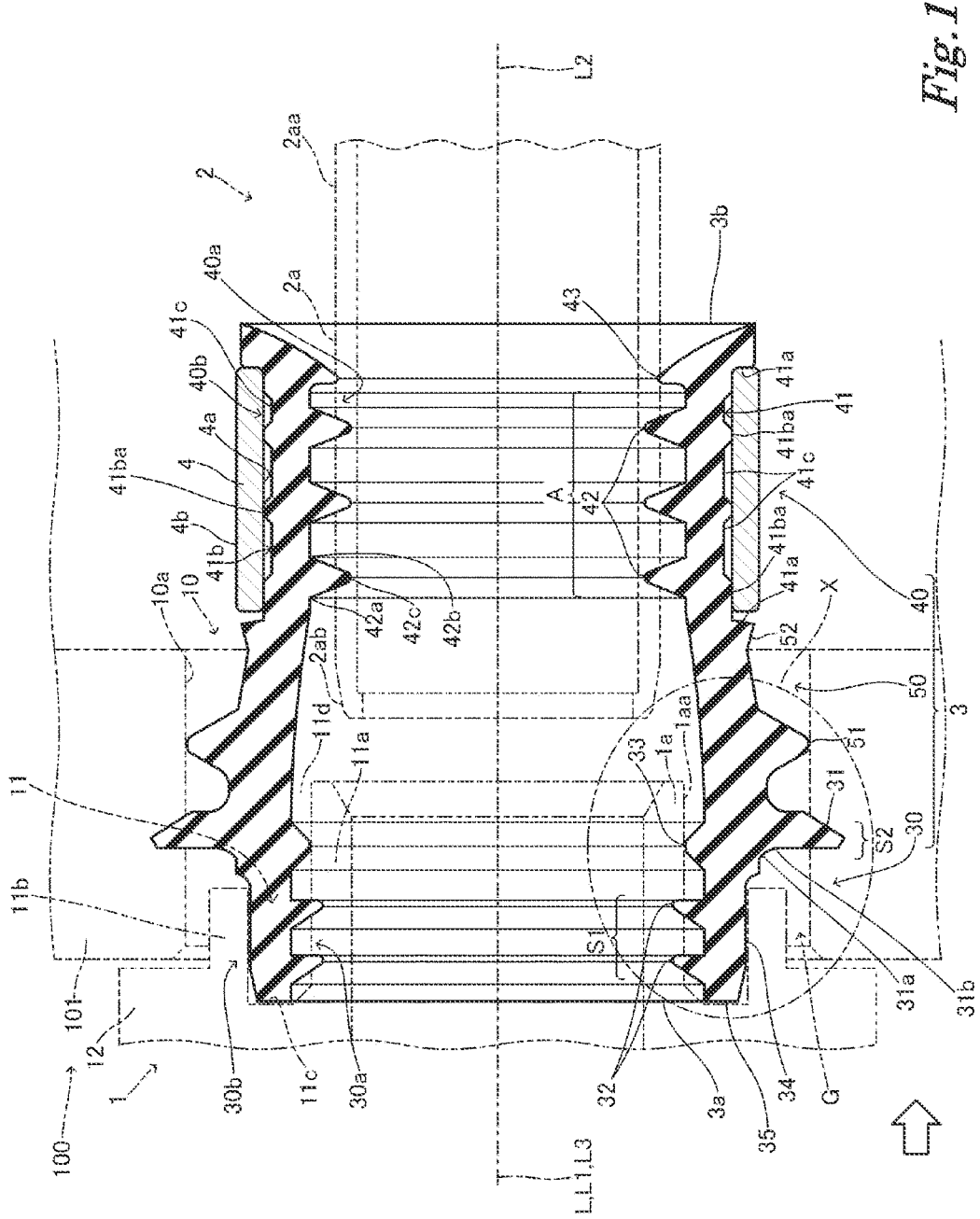
FIG. 1 is a sectional view diagrammatically illustrating an essential part of the first embodiment of the present invention when the gasket of the present invention is used as a connection member connecting two pipes.
Figure 2:
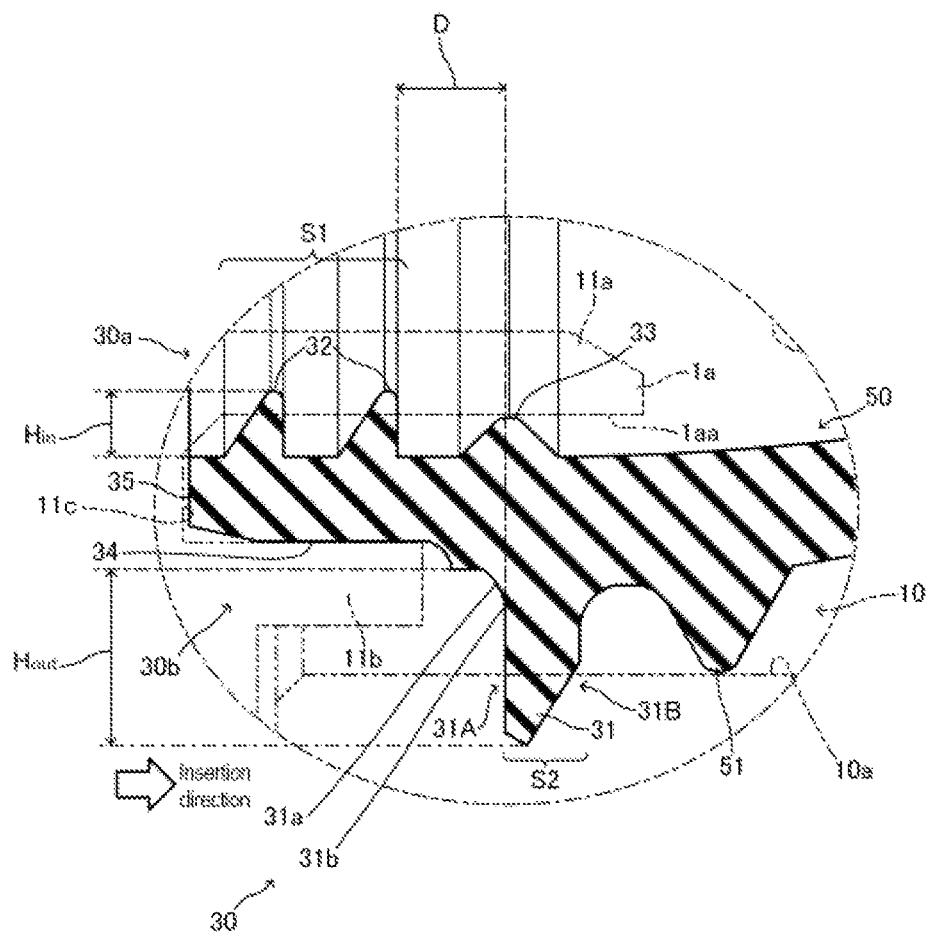
FIG. 2 is a partially enlarged sectional view diagrammatically illustrating the gasket of the embodiment, namely a partially enlarged view of the portion "X" in FIG. 1.

The embodiments of the present invention are explained hereinafter referring to the attached figures. In some figures, some of detailed reference numerals allotted to other figures are omitted. In FIG. 1 and FIG. 2, the original shape of a gasket 3 without being elastically deformed is illustrated with solid lines in order to facilitate explanation of the component elements of the gasket 3, although actually the gasket 3 is assembled in an elastically deformed manner like FIG. 3 and FIG. 4.

The gasket 3 of one embodiment of the present invention seals a space between a through hole 10 formed on a wall body 101 and a pipe 1 to be inserted into the through hole 10 and is constituted with a tubular elastic material to be provided for the pipe 1. The gasket 3 has an inner circumferential lip portion 32 elastically contacting an outer circumferential face 1aa of the pipe 1 and an outer circumferential lip portion 31 elastically contacting an inner circumferential face 10a of the through hole 10. An inner seal area S1 on the inner circumferential side having the inner circumferential lip portion 32 is provided at a position such that the inner seal area S1 does not overlap in the radial direction with an outer seal area S2, on the outer circumferential side, provided with the outer circumferential lip portion 31.

First Embodiment

A gasket 3 in the first embodiment is used as a connection member of a pipe connection structure which connects an outer hose with a cooling pipe of a cooling device which cools, for example, the electronic device for an automobile by a cooling medium. Such a case requires high sealing ability of a gasket which endures intrusion of outside rain and water injection at high-pressure cleaning of an automobile, in addition to prevention of leakage of cooling medium, and further requires the sealing ability which is kept at high when pipes are decentered or eccentric. In addition to the sealing ability, the gasket is required to inhibit adverse influence on the seal contact pressure by eccentricity, to reduce insertion load, and to improve assembling facility. The followings explain a pipe connection structure in which the second pipe 2 provided inside an inverter case 100 for an automobile and the first pipe 1 provided outside the inverter case 100 are connected by the gasket 3.

When an electric motor is provided as a driving source of an automobile, the operation of the electric motor is controlled by an inverter. The electric motor works as a motor which receives electric power from a battery and generates driving force. The inverter converts a direct-current power source supplied from the battery to an alternating-current power source by a switching operation and supplies electric power to the electric motor. Such an inverter used for an automobile needs large electric power, and a large amount of electric current is supplied to a switching element and so on, resulting in large amount of heat. Therefore, a cooling system for the inverter is adopted in such a manner that a cooling medium flow channel is constituted in the inverter case 100 housing the inverter to flow a cooling medium such as cooling water, cooling liquid or the like.

<Pipe Connection Structure>

The inverter case 100 is a box body in the shape of a substantial cuboid and is divided into an upper case and a lower case which are illustrated as a wall body 101 in FIG. 1. The inverter case 100 is constituted in such a manner that the upper case in the substantially concave shape in the sectional view is covered on and connected with the lower case in the substantially concave shape in the sectional view; and the upper and lower cases are fastened by a connector such as a bolt. The inverter case 100 is made of metal material such as aluminum, the cooling medium flow channel is provided in the inverter case 100 for flowing a cooling medium such as cooling water or cooling liquid for cooling the inverter, and the second pipe 2 (cooling pipe) constitutes a part of the cooling medium flow channel. Notch holes in the shape of a semi-circle are provided for the side walls of the upper case and the lower case at the facing position so as to form the through hole 10 when the upper and lower cases are connected and constitute the inverter case 100. The second pipe 2 is arranged in such a manner that the tip end of a connection end portion 2a is positioned in the through hole 10 as illustrated in FIG. 1, so that the tip end of the connection end portion 2a of the second pipe 2 is visually recognized when one looks into the inside of the inverter case 100 from the outside through the through hole 10. The shape of the through hole 10 is not specifically limited and is determined depending on the shape and size of the first pipe 1 (outer hose) to be connected to the second pipe 2. The diameter of the through hole 10 is determined so as to be larger than the outer diameter of the first pipe 1 to be inserted.

Here explained under the condition that the second pipe 2 constitutes a part of the cooling medium flow channel; however the second pipe 2 is not limited to such one and can be connected to a cooling medium flow channel which is separately provided. The reference "L" indicates the axial center of the through hole 10 provided for the inverter case 100, "L1" indicates the axial center of the first pipe 1, "L2" indicates the axial center of the second pipe 2, and "L3" indicates the axial center of the gasket 3. A connection structure in which the axial centers L, L1 to L3 are concentric as illustrated in FIG. 1 is preferable, but the connection structure of the embodiment is on the assumption that the axial centers L to L3 are eccentric.

<Gasket>

The gasket 3, which connects the first pipe 1 and the second pipe 2, is a member constituting the cooling medium flow channel, and is made from a tubular cast body the entire body of which is made from elastic material such as rubber material like ethylene-propylene rubber, butyl rubber, silicone rubber; elastomer; or synthetic resin. The gasket 3 has the first holding portion 30, the second holding portion 40 and a joint portion 50. The first holding portion 30 is fitted onto a connection end portion 1a of the first pipe 1 so as to cover thereon and is fitted into the inner circumferential face 10a of the through hole 10. The second holding portion 40 is fitted onto a connection end portion 2a of the second pipe 2 so as to cover thereon. The joint portion 50 is a member to join the first holding portion 30 and the second holding portion 40; the connection portion 50 itself being elastic, and displacement in the radial direction is possible when the first pipe 1 and the second pipe 2 become eccentric.

The outer diameter of the first pipe 1 is slightly larger than that of the second pipe 2, so that the inner diameter of the first holding portion 30 is larger than that of the second holding portion 40. Thus, the joint portion 50 joining the first holding portion 30 and the second holding portion 40 is tapered so as to gradually reduce the diameter from the first holding portion 30 to the second holding portion 40.

<First Pipe and Second Pipe>

The first pipe 1 is a hollow cylindrical body made from resin or the like and is constituted to supply a cooling medium to the second pipe 2 constituting the cooling medium flow channel in the inverter case 100. The second pipe 2 is a hollow cylindrical body made from resin or the like and the cooling medium supplied from the first pipe 1 is communicated therein.

The connection end portion 1a of the first pipe 1 has an annular concave portion 11, and an annular flange portion 12 projecting outward in the radial direction at the outer circumference further than the concave portion 11. The concave portion 11 has a bottom portion 11c, an inner wall 11a constituting an outer circumferential face 1aa, an outer wall 11b, and an open portion 11d. The concave portion 11 constituting the annular member is fitted to the first holding portion 30 of the gasket 3. On the fitting region of the concave portion 11 and the first holding portion 30, a streaky slit portion constituting an air passage, not illustrated, can be formed along the axial direction. When the slit portion is formed along the outer wall 11b from the bottom portion 11c until the open portion 11d of the concave portion 11, air is deflated from the slit portion at the time of fitting the first holding portion 30, further the first holding portion 30 of the gasket 3 is easily inserted into the outer circumferential face 1aa of the first pipe 1, corresponding to the inner wall 11a of the concave portion 11. With the first pipe 1 and the second pipe 2 being connected by the gasket 3, the flange portion 12 has a diameter larger than the through hole 10 so as to abut on the wall body 101, and is provided with an insertion hole, not illustrated, into which a fixture such as a screw is inserted. The first pipe 1, or the outer pipe, is fixed to the wall body 101 by fixing the flange portion 12 to the outer face of the wall body 101 by means of the fixture, not illustrated.

On the other hand, the tip side of the connection end portion 2a of the second pipe 2 has a slant tip side portion 2ab which has smaller diameter than other portions so as to facilitate attachment and detachment of the gasket 3.

The concave portion 11 constituting the annular member can be integrally formed with the first pipe 1 as illustrated in FIG. 1, or can be separately formed and fitted to a tubular pipe. Also the flange portion 12 can be integrally formed with the first pipe 1 as illustrated in FIG. 1, or can be separately formed and fitted to a tubular pipe.

<First Holding Portion>

The first holding portion 30 has the inner circumferential lip portion 32, an inner circumferential projecting portion 33, the outer circumferential lip portion 31, a flat portion 34, and an end portion 35. The inner circumferential lip portion 32 is an annular lip entirely along the circumferential direction, elastically contacts the outer circumferential face 1aa of the first pipe 1, and is fitted to the concave portion 11 in an elastically deformed manner. The inner circumferential projecting portion 33 is provided adjacent to the inner circumferential lip portion 32. The outer circumferential lip portion 31 is an annular lip entirely along the circumferential direction and elastically contacts the inner circumferential face 10a of the through hole 10 with a fastening margin accompanied with bending deformation. The flat portion 34 is formed flat. A gap "G" is formed between the flat portion 34 and the inner circumferential face 10a of the through hole 10 so that the flat portion abuts along the outer wall 11b of the concave portion 11. The end portion 35 is formed flat so as to abut on the bottom portion 11c of the concave portion 11.

Figure 3:
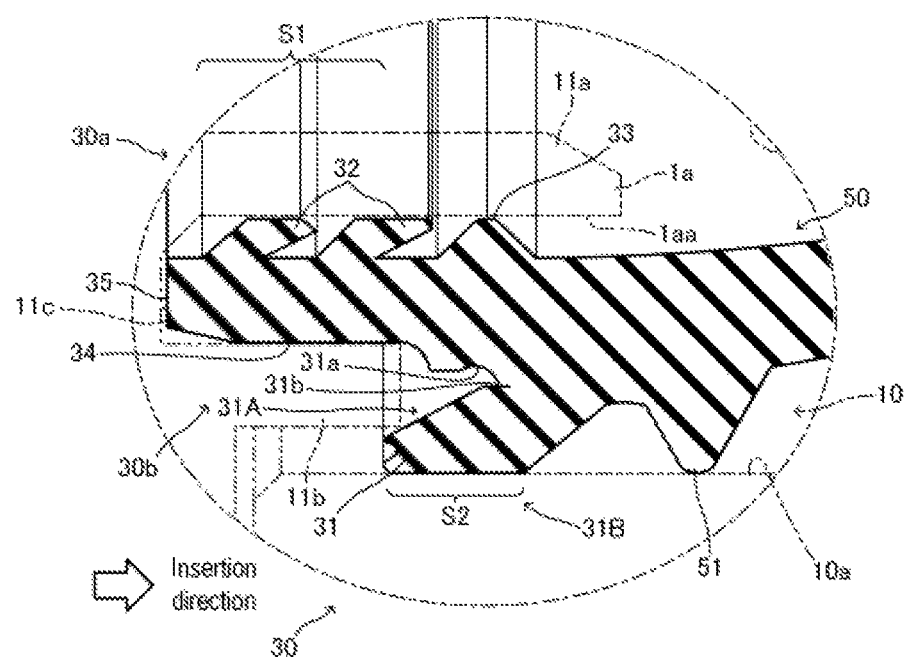
FIG. 3 is a partially enlarged sectional view diagrammatically illustrating that the gasket of the embodiment is assembled.

FIG. 2 and FIG. 3 are partially enlarged views of the portion indicated with "X" of the gasket 3 illustrated in FIG. 1. FIG. 2 illustrates the original shape of the gasket 3 without elastic deformation as mentioned above. FIG. 3 illustrates that the gasket 3 is assembled to the first pipe 1 and the through hole 10 and is elastically deformed.

As illustrated in FIG. 2, the projection amount Hout of the outer circumferential lip portion 31 is larger than the projection amount Hin of the inner circumferential lip portion 32. A plurality of the inner circumferential lip portions 32 are arranged in line, and an area on the inner circumferential side provided with the plurality of inner circumferential lip portions 32, 32 is defined as the inner seal area S1. An area on the outer circumferential side provided with the outer circumferential lip portion 31 is defined as the outer seal area S2. The inner seal area S1 and the outer seal area S2 are arranged so as not to overlap in the radial direction, the inner seal area S1 is fitted onto one pipe, namely the first pipe 1, and the outer seal area S2 is fitted into the through hole 10.

The inner seal area S1 and the outer seal area S2 provided for the first holding portion 30 are arranged so as not to overlap in the radial direction as illustrated in FIG. 2, so that an increase in insertion load is prevented when the first pipe 1 is inserted into the through hole 10 of the wall body 101 with the gasket 3 fitted to and assembled with the connection end portion 1a of the first pipe 1, thereby improving assembling facility. For example, even when the axial center L1 of the first pipe 1 and the axial center L of the through hole 10 are decentered and become eccentric, sealing ability is kept without being adversely influenced by the contact pressure variation and the inner stress of the inner and outer seal areas S1, S2 at eccentric condition since the inner seal area S1 and the outer seal area S2 are provided so as not to overlap in the radial direction.

The distance "D" between the inner seal area S1 and the outer seal area S2 when they are provided so as not to overlap in the radial direction is larger than the projection amount Hin of the inner circumferential lip portion 32, namely D is larger than Hin as illustrated in FIG. 2.

The inner circumferential lip portion 32 provided for the inner seal area S1 elastically contacts the outer circumferential face 1aa of the first pipe 1 in a fallen manner as illustrated in FIG. 3. The inner stress of the inner circumferential lip portion 32 increases but the above-mentioned structure prevents adverse influence on the base portion of the outer circumferential lip portion 31 and prevents concentration of the stress.

As illustrated in FIG. 2, the projection amount Hout of the outer circumferential lip portion 31 is larger than the projection amount Hin of the inner circumferential lip portion 32 as illustrated in FIG. 2. Therefore, the contact face of the outer circumferential lip portion 31 with the inner circumferential face 10a of the through hole 10 increases and the sealing ability with the through hole 10 improves as illustrated in FIG. 3.

The inner seal area S1 is provided on an opposite side of the outer seal area S2 along the insertion direction of the first pipe 1, namely the direction along the outlined arrow in FIG. 2, the outer circumferential face 30b corresponding to the region where the inner seal area S1 is formed is defined as the flat portion 34, and the outer wall 11b of the concave portion 11 constituting the annular member is fitted along the flat portion 34. Therefore, even when the first pipe 1 is eccentric, the inner circumferential lip portions 32, 32 provided in the inner seal area S1 keep stable sealing ability.

The inner circumferential projecting portion 33 is provided adjacent to the inner circumferential lip portions 32, 32 provided in the inner seal area S1 and is formed on the inner circumferential face 30a corresponding to the position where the outer circumferential lip portion 31 is formed. The inner circumferential projecting portion 33 can be formed entirely along the circumferential direction or can be discontinuously formed with a space. The inner circumferential lip portion 32 is formed so as to have enough length to elastically deform and fall, and an elastic contact portion elastically contacting the inner wall 11a is formed in the shape of a tapered chevron in the sectional view as illustrated in FIG. 3. The inner circumferential projecting portion 33 has smaller projection amount than the inner circumferential lip portion 32 and is formed in the shape of a chevron in the sectional view.

The inner circumferential projecting portion 33 is provided for the inner circumferential face 30a corresponding to the position where the outer circumferential lip portion 31 is formed, so that the first pipe 1 is kept at a correct position, where the axial center L1 of the first pipe 1 and the axial center L of the through hole 10 substantially meet, even if force to make eccentric is applied on the first pipe 1. When the first pipe 1 becomes eccentric, the inner circumferential projecting portion 33 abuts on the outer circumferential face 1aa of the first pipe 1, inhibits excessive compression, and prevents adverse influence on the seal contact pressure of the inner circumferential lip portion 32, thereby keeping good sealing ability. In addition, when the pressure of the cooling medium in the first pipe 1 increases, the first holding portion 30 mounted on the first pipe 1 generates the force to pull out of the concave portion 11, but the pressing force of the inner circumferential lip portion 32, the inner circumferential projecting portion 33 and the outer circumferential lip portion 31 acts on the first holding portion 30 so that the first holding portion 30 is not pulled out of the concave portion 11.

In this embodiment, an example in which the inner circumferential projecting portion 33 abuts on the outer circumferential face 1aa of the first pipe 1 is illustrated; however, the inner circumferential projecting portion 33 can elastically contact the outer circumferential face 1aa of the first pipe 1 in eccentric condition or can be close to the outer circumferential face 1aa, with some gap, at a correct position.

The outer circumferential face 30b of the first holding portion 30 has the outer circumferential lip portion 31 which elastically deforms and abuts on the inner circumferential face 10a of the through hole 10. As illustrated in FIG. 2, one face 31A of the outer circumferential lip portion 31 on the opposite side of the insertion direction of the first pipe 1 is linear and the other face 31B slants so as to be gradually tapered toward the tip end portion. The base portion of the outer circumferential lip portion 31 of the one face 31A has a bent portion 31b, a bending point, of the outer circumferential lip portion 31 when the outer circumferential lip portion 31 elastically contacts the inner circumferential face 10a of the through hole 10. The bent portion 31b is a cross point of the one face 31A and a slant portion 31a formed from the outer circumferential face 30b to the one face 31A in a slant manner. As illustrated in FIG. 3, the outer circumferential lip portion 31 is deformed in a fallen manner and elastically contacts the inner circumferential face 10a of the through hole 10. Therefore, the sealing ability is kept between the first pipe 1 and the inner circumferential face 10a of and the through hole 10 when the first pipe 1 is eccentric, and high followability is achieved by the bent deformation of the outer circumferential lip portion 31. When the outer circumferential lip portion 31 elastically contacts the inner circumferential face 10a of the through hole 10, the outer circumferential lip portion 31 is flexed at the bent portion 31b, i.e., the bending point; and the bent portion 31b is located at the base portion of the outer circumferential lip portion 31, so that the outer circumferential lip portion 31 is bent so as to be broken sharply, not to be smoothly flexed, referring to FIG. 3. Thus, the insertion load is reduced when the first pipe 1 is inserted into the through hole 10, thereby improving insertion performance. In addition, the contact face with the inner circumferential face 10a of the through hole 10 increases and the sealing ability is improved. Even when the inner circumferential face 10a of the through hole 10 has a blow hole, a blemish, sticking of foreign material and so on, the sealing ability is kept by elastic contact of the outer circumferential lip portion 31.

<Joint Portion>

The joint portion 50, being elastically deformable, joins the first holding portion 30 attached to the connection end portion 1a of the first pipe 1 and the second holding portion 40 attached to the connection end portion 2a of the second pipe 2. The first holding portion 30 and the second holding portion 40 are different in diameter depending on the diameters of the first pipe 1 and the second pipe 2, so that the joint portion 50 is tapered. Namely, the joint portion 50 slants relative to the axial center L3 of the gasket 3 and the joint portion 50 is angled to the axial center L3. The angle works as a draft angle in case of molding the gasket 3, thereby the gasket 3 is easily demolded.

The joint portion 50 has an outer circumferential projecting portion 51 which has a chevron-shaped section and which elastically contacts the inner circumferential face 10a of the through hole 10, adjacent to the pipe insertion direction side (on the second holding portion 40 side) of the outer circumferential lip portion 31. The outer circumferential projecting portion 51 can be formed entirely along the circumferential direction or can be formed discontinuously with a space. The outer circumferential projecting portion 51 has a chevron-shaped section which is smaller than the outer circumferential lip portion 31 in the projection amount.

In this embodiment, the outer circumferential projecting portion 51 abutting on the inner circumferential face 10a of the through hole 10 is illustrated. On the other hand, the outer circumferential projecting portion 51 can elastically contact the inner circumferential face 10a in eccentric condition and can be adjacent to the inner circumferential face 10a (with a slight gap) at a correct position.

Figure 4:
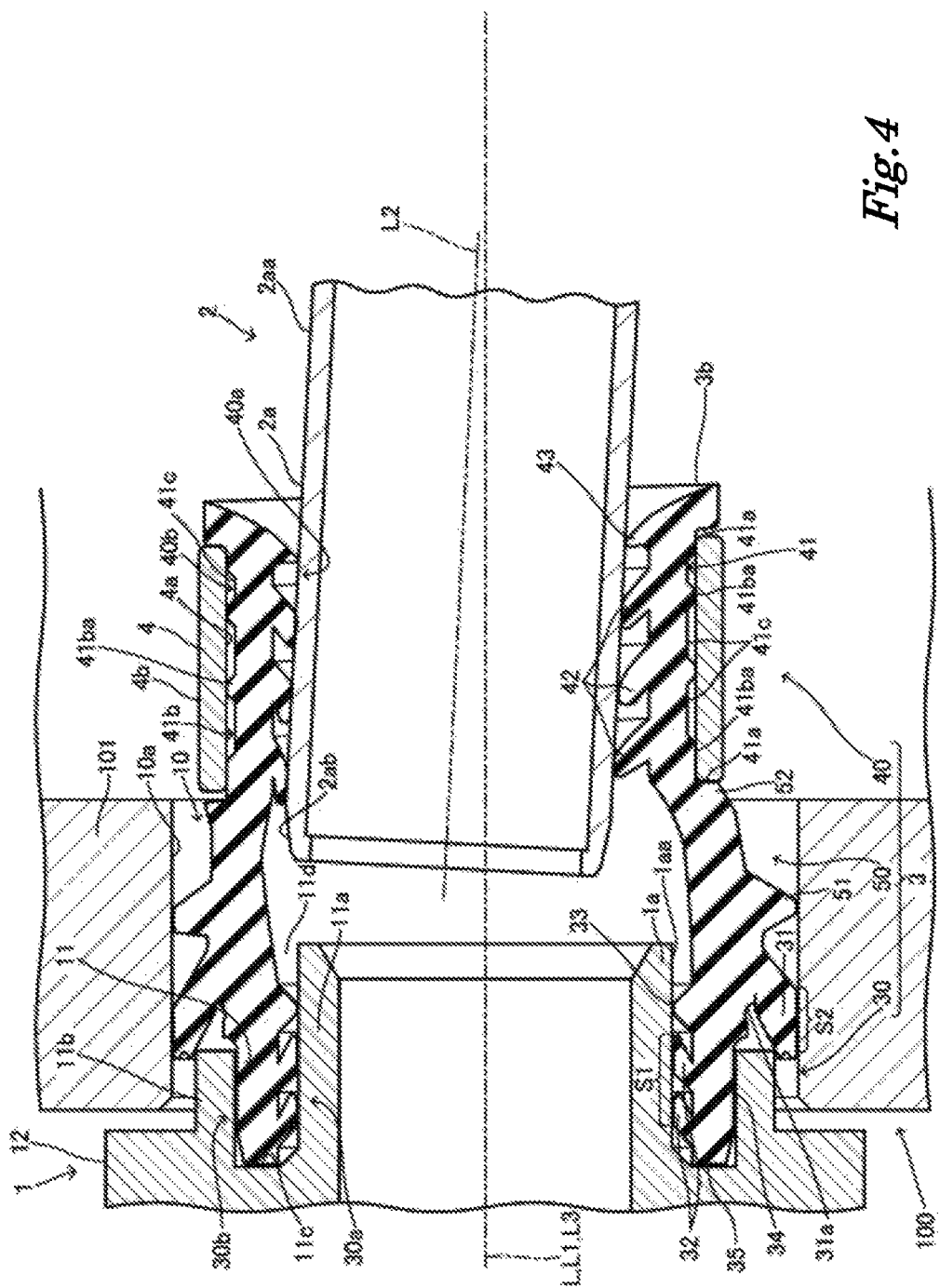
FIG. 4 is an explanatory view of the gasket of the embodiment and a sectional view diagrammatically illustrating that one of the connected pipes is eccentric.

FIG. 4 illustrates a sectional view when the second pipe 2 is eccentric.

As illustrated in the figure, the outer circumferential projecting portion 51 is provided adjacent to the pipe insertion direction side of the outer circumferential lip portion 31, so that the outer circumferential projecting portion 51 surely abuts on the inner circumferential face 10a of the through hole 10, and the outer circumferential projecting portion 51 keeps the first pipe 1, which is apt to be eccentric, at a correct position, the same as above. When the second pipe 2 is eccentric, the outer circumferential projecting portion 51 abuts on the inner circumferential face 10a of the through hole 10, inhibits excessive compression of the outer circumferential lip portion 31, thereby preventing adverse influence on the seal contact pressure of the outer circumferential lip portion 31 and keeping sealing ability.

A space between the inner circumferential face 10a of the through hole 10 and the gasket 3 is sealed by the outer circumferential lip portion 31; the inner seal area S1 with the lip portion 42 on the inner circumferential face 30a side and the outer seal area S2 with the above-mentioned outer circumferential lip portion on the outer circumferential face 30b side are arranged so as not to overlap in the radial direction, so that even when the axial centers L1, L2 of the first and second pipes 1, 2 are eccentric in any direction, independent seal structure is kept and adverse influence on the seal contact pressure is inhibited. When the joint portion 50 is flexed by the eccentricity, the gasket 3 is duly supported because the outer circumferential projecting portion 51 abuts on the inner circumferential face 10a of the through hole 10, and adverse influence on the seal contact pressure on the first holding portion 30 and the second holding portion 40 is inhibited. The gasket 3 is supported by the outer circumferential projecting portion 51, and dent and buckling caused by displacement in the radial direction are prevented, so that assembly is facilitated in such a manner that the first pipe 1 is inserted into the through hole 10 and is connected to the second pipe 2 via a gasket 3.

<Second Holding Portion>

The inner circumferential face 40a of the second holding portion 40 abuts on the outer circumferential face 2aa of the second pipe 2 and has a lip-forming area A with an annular lip portion 42, as illustrated in FIG. 1. The outer circumferential face 40b of the second holding portion 40 corresponding to the lip-forming area A provided on the inner circumferential face 40a has an annular concave linear portion 41 having a bottom portion 41b and a pair of groove wall portions 41a, 41a. The concave linear portion 41 is formed annular along the circumferential direction and houses a reinforcement ring 4, which reinforces fitting to the second pipe 2, in a fitted manner. The reinforcement ring 4 is an annular body made from metal, synthetic resin or the like and is formed in a dimension depending on the groove depth and the groove width of the concave linear portion 41. The reinforcement ring 4 is provided on the outer circumferential face 40b of the second holding portion 40 corresponding to the lip-forming area A. When the reinforcement ring 4, housed in the concave linear portion 41 of the second holding portion 40, is fitted onto the second pipe 2, the reinforcement ring 4 exerts fastening function in the centripetal direction, the sealing force to the second pipe 2 by the reinforcement ring 4 and the lip portion 42 is strengthened, and the second pipe 2 is stably held.

A projecting portion 43 is provided adjacent to the lip portion 42 on the other end 3b of the gasket 3. The projecting portion 43 is formed entirely along the circumferential direction, and the top portion of the projecting portion 43 has a chevron-shaped section and slants to the opposite direction to the pipe insertion direction so as to facilitate insertion of the gasket 3 into the second pipe 2. The projecting portion 43 elastically contacts the outer circumferential face 2aa of the second pipe 2. The projection amount of the projecting portion 43 and the distance between the projecting portion 43 and the adjacent lip portion 42 are preferably determined in such a manner that the projecting portion 43 does not abut on the lip portion 42 even when the projecting portion 43 is fitted to the outer circumferential face 2aa of the second pipe 2, the top portion is slightly deformed in an elastic manner, and the projecting portion 43 falls into the lip portion 42 side; and the projection amount of the projecting portion 43 is smaller than that of the lip portion 42.

The bottom portion 41b of the concave linear portion 41 provided for the second holding portion 40 has an abutting portion 41ba abutting on an inner circumferential face 4a of the reinforcement ring 4 and a concave dent portion 41c which does not abut on the inner circumferential face 4a of the reinforcement ring 4. The abutting portion 41ba is formed at a position on the side of the joint portion 50 (on one end 3a side of the gasket 3) corresponding to a base portion 42a of the lip portion 42, and the dent portion 41c is formed at a position corresponding to the base portion 42b of the lip portion 42 on the opposite side of the joint portion (on the other end 3b side of the gasket 3).

The bottom portion 41b provided on the outer circumferential face 40b of the second holding portion 40 has the dent portion 41c, so that a gap is formed between the reinforcement ring 4 and the outer circumferential face 40b of the second hooding portion 40. Thus, the contact area of the reinforcement ring 4 and the second holding portion 40 is reduced, contact pressure of the lip portion 42 generated at the time of insertion or pulling-out of the second holding portion 40 into or from the second pipe 2 is reduced, and insertion load and pulling-out load are reduced. Further, the dent portion 41c is formed on the concave linear portion 41 housing the reinforcement ring 4, so that contact area is reduced when the reinforcement ring 4 is fitted onto the outer circumferential face 40b of the second holding portion 40, thereby reducing resistance caused by abrasion and facilitating assembly of the reinforcement ring 4. The abutting portion 41ba is formed at a position corresponding to the base portion 42a of the lip portion 42 on the joint portion 50 side, and the dent portion 41c is formed at a position corresponding to the base portion 42b of the lip portion 42 on the opposite side of the joint portion, thereby obtaining appropriate seal contact pressure of the lip portion 42 after insertion and reducing the load of insertion and pulling-out of the gasket 3.

A plurality of lip portions 42 have the same chevron-shaped section in size and shape and are annularly formed along the circumferential direction. The abutting portion 41ba includes a position corresponding to the top portion 42c of the lip portion 42 and another position corresponding to the base portion 42a of the lip portion 42 on the joint portion 50 side. As the abutting portion 41ba includes the position corresponding to the top portion 42c of the lip portion 42 and the position corresponding to the base portion 42a of the lip portion 42 on the joint portion 50 side, the position corresponding to the top portion 42c of the lip portion 42 and the position corresponding to the base portion 42a of the lip portion 42 on the joint portion 50 side are supported by the reinforcement ring 4, thereby increasing the seal contact pressure and improving sealing ability.

The dent portion 41c is formed corresponding to a position without the lip portion 42. Specifically, three dent portions 41c are formed in the example illustrated in FIG. 1. The dent portion 41c closest to the joint portion 50 is formed from the position corresponding to the top portion 42c of the lip portion 42 on the joint portion 50 side to the position corresponding to the base portion 42a of the adjacent lip portion 42 on the joint portion 50 side. The dent portion 41c second closest to the joint portion 50 is formed from the position corresponding to the top portion 42c of the lip portion 42 on the joint portion 50 side to the position corresponding to the base portion 42a of the adjacent lip portion 42 on the joint portion 50 side. The dent portion 41c most apart from the joint portion 50, namely on the side of the other end 3b, is formed from the position corresponding to the top portion 42c of the lip portion 42 on the most apart side from the joint portion 50 to the other end 3b side further than the position corresponding to the base portion 42b of the lip portion 42 on the most apart position from the joint portion 50.

The dent portion 41c provided as above sufficiently reduces the contact pressure of the lip portion 42 generated when the second holding portion 40 is inserted into and pulled out of the second pipe 2 and reduces the load of insertion and pulling-out.

Further the concave linear portion 41 further has the dent portions 41c of the same number as that of the lip portions 42. In the example of FIG. 1, three dent portions 41c are provided corresponding to three lip portions 42. The dent portions 41c can be provided annularly along the circumferential direction like the lip portion 42 or can be provided discontinuously with a space. As the dent portions 41c are provided corresponding to the number of the lip portions 42, an excessive increase in the contact pressure due to an increase in the number of the lip portions 42 is inhibited. Because a plurality of lip portions 42 are provided, the second holding portion 40 easily follows the deformation and the seal contact pressure is secured even when the second pipe 2 slants and becomes eccentric. Further, the dent portion 41c is provided relative to each one of the lip portions 42, so that the contact area is reduced when the reinforcement ring 4 is assembled to the concave linear portion 41, thereby facilitating assembly.

The lip portions 42, 42, 42 provided for the second holding portion 40 are formed with a distance or a space therebetween. The projection amounts of the lip portions 42, 42, 42 are larger than the distances between adjacent lip portions 42, 42. The lip portion 42 elastically contacts the second pipe 2 with a fastening margin; the distance between the adjacent lip portions 42, 42 is larger than the fastening margin of the lip portion 42.

Even when the second pipe 2 sometimes vibrates or causes thermal swelling due to the feature of the material, the lip portions 42, 42, provided as mentioned above, do not contact each other while being assembled to the second pipe 2, referring to FIG. 3 and FIG. 4, the lip portions 42, 42 follow the movement of the second pipe 2, thereby keeping the sealing ability. The adjacent lip portions 42, 42 do not contact each other in case of assembly to the second pipe, so that the reaction force of the lips caused by fixation of the lip portions 42, namely adherence of lip portions 42, 42, does not extremely increase, thereby preventing increase in the load of insertion and pulling-out, and improving facility of insertion and pulling-out.

Next explained is a connection procedure of the first pipe 1 and the second pipe 2 at the through hole 10 using the gasket 3 constituted as mentioned above.

<Connection Procedure>

The gasket 3 houses the reinforcement ring 4 which is fitted to the concave linear portion 41 of the second holding portion 40 in advance. The concave linear portion 41 in which the reinforcement ring 4 is housed has the dent portion 41c, thereby reducing the contact area of the reinforcement ring 4, reducing resistance by abrasion, and facilitating assembly of the reinforcement ring 4.

Next, as illustrated in FIG. 3, the first holding portion 30 of the gasket 3 is fitted to the concave portion 11 of the first pipe 1, and the gasket 3 is assembled to the first pipe 1. At assembling, the inner circumferential lip portion 32 elastically deforms when obliquely falling from the bottom portion 11c to the open portion 11d.

The gasket 3 is inserted into the through hole 10 of the wall body 101 from the outside and the first pipe 1 is then inserted, referring to the outlined arrow in FIG. 1. The other end 3b of the gasket 3 reaches the connection end portion 2a of the second pipe 2, firstly the top portion of the projecting portion 43 elastically contacts the tip side portion 2ab of the second pipe 2. The tip side portion 2ab is formed slanted in such a manner that the diameter is smaller than the other region of the second pipe 2 and gradually expands, so that the projecting portion 43 slanted in the opposite side to the pipe insertion direction smoothly deforms in an elastic manner. Then, the lip portion 42 provided on the other end 3b side elastically contacts the outer circumferential face 2aa of the second pipe 2, elastically deforms while being compressed, and is fitted onto the second pipe 2 in an obliquely slant manner.

Then, the gasket 3 is inserted into the second pipe 2 until the flange portion 12 of the first pipe 1 abuts on the wall body 101, so the outer circumferential lip portion 31 elastically contacts the inner circumferential face 10a of the through hole 10. The inner seal area S1 and the outer seal area S2 are provided so as not to overlap in the radial direction, thereby preventing increase in insertion load and improving assembly performance. When the axial center L1 of the first pipe 1 and the axial center L of the through hole 10 are decentered and become eccentric, since the inner seal area S1 and the outer seal area S2 do not overlap in the radial direction, the sealing ability is kept without adversely influenced by the change in the contact pressure and by the inner stress of the inner and outer seal areas S1, S2 under eccentric condition. In such a case, since the joint portion 50 having elasticity is capable of displacing in the radial direction, when the axial center L of the through hole 10 and the axial center L2 of the second pipe 2 are slightly decentered, such a decentering is absorbed by the elastic deformation of the joint portion 50. Specifically, because the joint portion 50 is tapered and is made from elastic material, the eccentricity is efficiently absorbed. The outer circumferential lip portion 31 has the bent portion 31b, so that the outer circumferential lip portion 31 is able to be sharply bent with the bent portion 31b as the bending point when elastically contacting the inner circumferential face 10a of the through hole 10. Thus, the insertion load is reduced when the first pipe 1 is inserted into the through hole 10, thereby improving insertion performance.

Finally, when the flange portion 12 of the first pipe 1 is fixed to the wall body 101 by means of a fixing device, not illustrated, connection of two pipes 1, 2 is completed.

When pipes are connected via the gasket 3, the fitted portion of the first holding portion 30 onto the first pipe 1 and the fitted portion of the second holding portion 40 onto the second pipe 2 include the annular inner circumferential lip portion 32 and the annular lip portion 42 in a compressed manner, respectively; consequently the connection structure has high sealing ability and cooling medium flows through the gasket between the first pipe 1 and the second pipe 2. In addition, the annular outer circumferential lip portion 31 is included in a compressed manner between the first holding portion 30 and the through hole 10, so that the outside and inside of the inverter case 100 via the through hole 10 are sealed, thereby preventing intrusion of dust and so on from outside into the inverter case 100 via the through hole 10.

Next, how the first pipe 1 connected as mentioned above is pulled out is explained.

<Pulling-Out Procedure>

The fixing device which is inserted into the insertion hole of the flange portion 12 of the first pipe 1 and fixes the first pipe 1 to the wall body 101 is removed, the flange portion 12 of the first pipe 1 is grasped, and force is applied in a direction so as to depart from the second pipe 2, namely in the pull-out direction. The lip portion 42, the projecting portion 43, and the outer circumferential lip portion 31 are reversed and the top portions thereof fall to the pipe insertion direction. At this time, because of the dent portion 41c provided for the recessed linear portion 41, the contact pressure of the lip portion 42 generated at the time of pulling out is reduced. A plurality of lip portions 42 are provided with a predetermined distance (space) and the lip portion 42 has a predetermined projection amount, so that the adjacent lip portions 42, 42 are not fixed with each other and lip stress does not increase. Therefore, increase in the load of pulling-out is prevented.

Force is further applied into the pulling-out direction under the condition mentioned above, the gasket 3 is separated from the second pipe 2 and is smoothly pulled out from the second pipe 2 together with the first pipe 1.

Second Embodiment

Referring to FIG. 5, a gasket 3A in the second embodiment is explained.

The common members are allotted with the same reference members of those of the gasket 3 in the first embodiment and the explanation is omitted here. The reference "LA" indicates the axial center of a pipe 1A.

Figure 5A:
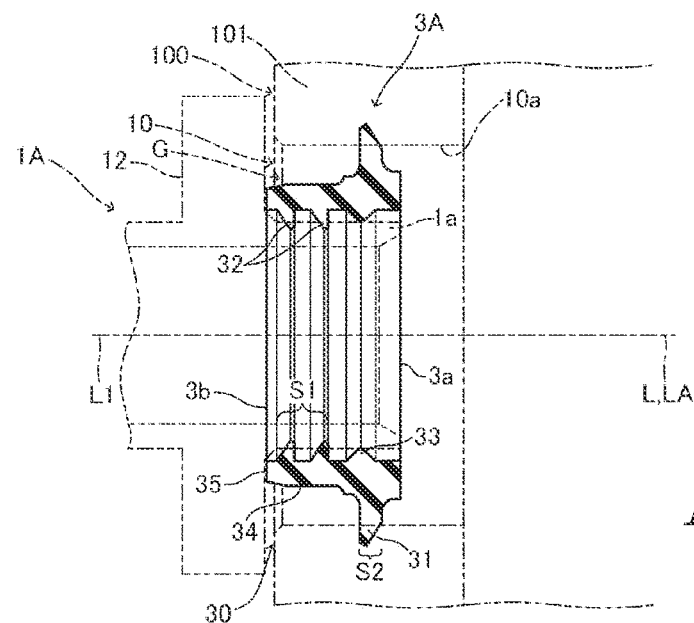
FIG. 5A illustrates the second embodiment of the gasket of the present invention.
Figure 5B:
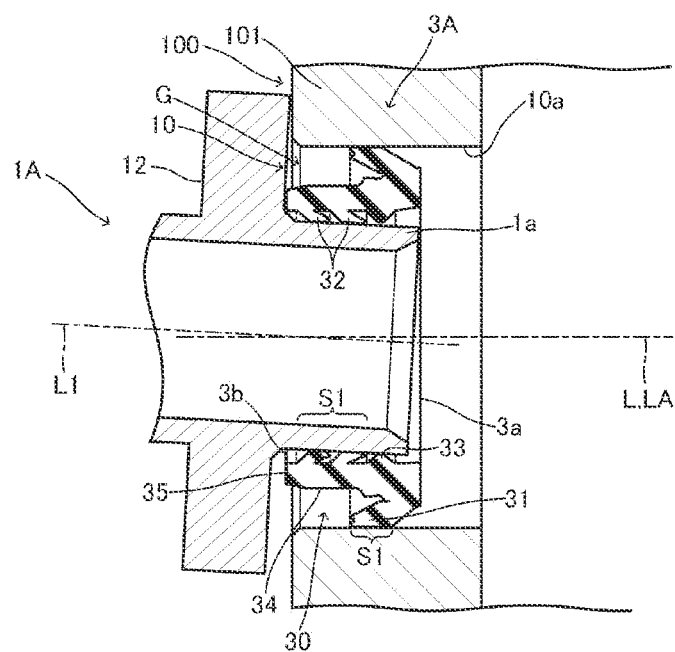
FIG. 5B is an explanatory view illustrating that the gasket of the embodiment is used for connecting one pipe with a through hole and is a sectional view diagrammatically illustrating that the held pipe is eccentric.

The gasket 3A in the second embodiment is an example when the gasket is used for connecting one pipe 1A to the through hole 10 provided for the wall body 101 constituting the housing. The gasket 3A seals a space between the through hole 10 provided for the wall body 101 and the pipe 1A to be inserted into the through hole 10. The pipe 1A is constituted with a hollow cylindrical body made from resin or the like, and the outer circumference of the connection end portion 1a of the pipe 1A has the annular flange portion 12 projecting outwardly in the radial direction. The pipe 1A is different in shape from the first pipe 1 in the first embodiment in that the pipe 1A does not have the dent portion 11 constituting the annular member. The flange portion 12 has an insertion hole, not illustrated, into which a fixing device such as a screw is inserted; the pipe 1A is fixed to the wall body 101 by fixing the flange portion 12 to the outside face of the wall body 101 by the fixing device. The gasket 3A is fitted onto the pipe 1A and has the first holding portion 30 constituted as mentioned in the first embodiment. The gasket 3A has the first holding portion 30 having the inner circumferential lip portion 32, the inner circumferential projecting portion 33, the outer circumferential lip portion 31, the flat portion 34, and the end portion 35. The second embodiment is the same as the first embodiment in that the inner seal area S1 and the outer seal area S2 provided for the first holding portion 30 are positioned so as not to overlap in the radial direction as illustrated in FIG. 5A and FIG. 5B, and the inner seal area S1 is provided on the opposite side of the outer seal area S2 along the insertion direction of the pipe 1A.

Even in the gasket 3A without the joint portion and the second holding portion in the second embodiment, when the inner seal area S1 and the outer seal area S2 provided for the first holding portion 30 are arranged so as not to overlap in the radial direction, the insertion load is prevented from increasing in a state in which the pipe 1A of which connection end portion 1a is fitted to and assembled with the gasket 3A is inserted into the through hole 10 of the wall body 101, and assembly performance is improved. When the axial center LA of the pipe 1A and the axial center L of the through hole 10 are decentered and become eccentric as illustrated in FIG. 5B, since the inner seal area S1 and the outer seal area S2 do not overlap in the radial direction, good sealing ability is kept without being adversely influenced by the change in the contact pressure and by the inner stress of the inner and outer seal areas S1, S2 under an eccentric condition.

Third Embodiment

Referring to FIG. 6, a gasket 3B in the third embodiment is explained.

The common members are allotted with the same reference numerals as those of the gasket 3 in the first embodiment and the explanation is omitted here. The reference "LB" indicates the axial center of a pipe 1B.

Figure 6A:
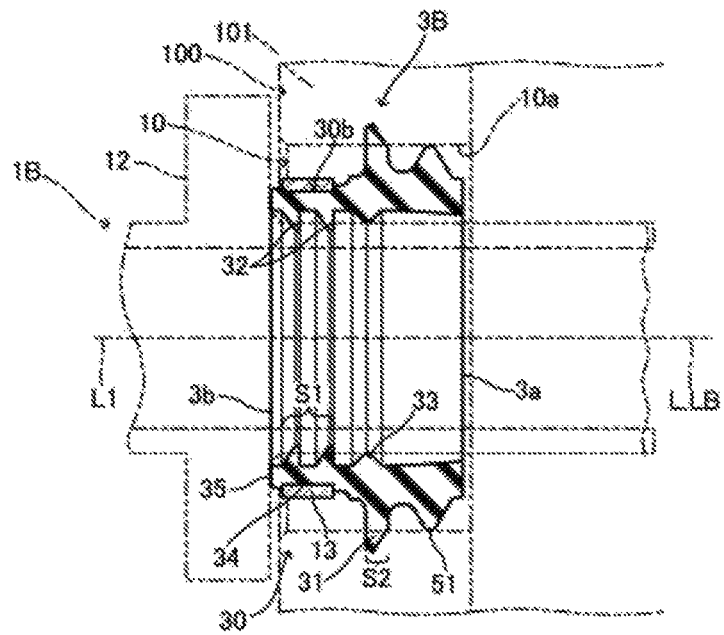
FIG. 6A illustrates the third embodiment of the gasket of the present invention.
Figure 6B:
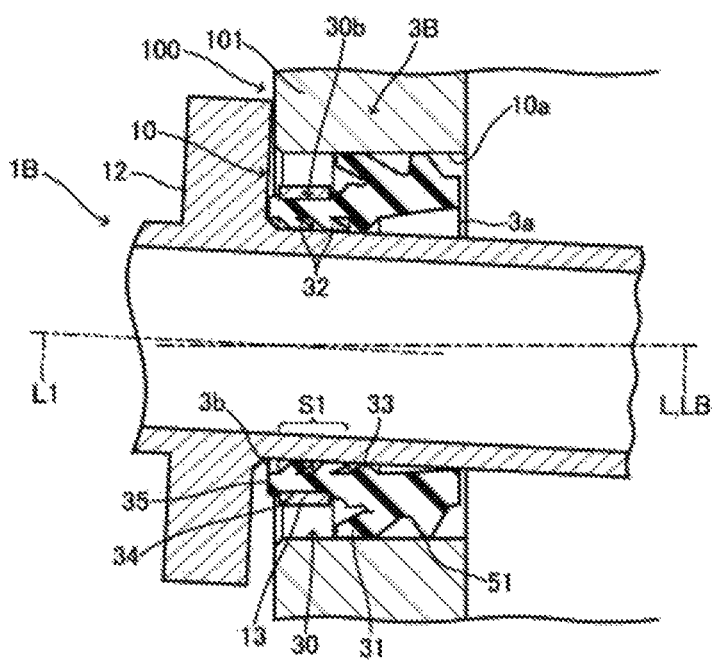
FIG. 6B is an explanatory view illustrating that the gasket of the embodiment is used for connecting one pipe with a through hole and is a sectional view diagrammatically illustrating that the held pipe is eccentric.

The gasket 3B in the third embodiment is an example when the gasket is used for connecting one pipe 1B to the through hole 10 provided for the wall body 101 constituting the housing, the pipe 1B has enough length so as to be deeply inserted into the housing. The gasket 3B seals a space between the through hole 10 provided for the wall body 101 and the pipe 1B to be inserted into the through hole 10. The pipe 1B is constituted with a hollow cylindrical body made from resin or the like, and the outer circumference of the pipe 1B has the annular flange portion 12 projecting outwardly in the radial direction. Like the pipe 1A in the second embodiment, the pipe 1B is different in shape from the first pipe 1 in the first embodiment in that the pipe 1B does not have the dent portion 11. An annular member 13 is fitted onto the outer circumferential face 30b of the gasket 3B of the third embodiment corresponding to the region where the inner seal area S1 is formed. The flange portion 12 has an insertion hole, not illustrated, into which a fixing device such as a screw is inserted; the pipe 1B is fixed to the wall body 101 by fixing the flange portion 12 to the outside face of the wall body 101 by the fixing device. The gasket 3B is fitted onto the outer circumference of the pipe 1B close to the flange portion 12, has the first holding portion 30 which is the same as explained in the first embodiment, and has the outer circumferential projecting portion 51, which is provided for the joint portion 50 in the first embodiment, adjacent to the outer circumferential lip portion 31. Namely, the gasket 3B has the outer circumferential projecting portion 51 and the first holding portion 30 having the inner circumferential lip portion 32, the inner circumferential projecting portion 33, the outer circumferential lip portion 31, the flat portion 34, and the end portion 35. The third embodiment is the same as the first embodiment in that the inner seal area S1 and the outer seal area S2 provided for the first holding portion 30 are positioned so as not to overlap in the radial direction as illustrated in FIG. 6A and FIG. 6B, and the inner seal area S1 is provided on the opposite side of the outer seal area S2 along the insertion direction of the pipe 1A.

In the gasket 3B of the third embodiment without the joint portion and the second holding portion, when the inner seal area S1 and the outer seal area S2 are provided so as not to overlap in the radial direction, the insertion load is prevented from increasing in a state in which that the pipe 1B with the gasket 3B fitted to and assembled is inserted into the through hole 10 of the wall body 101, and assembly performance is improved. When the axial center LB of the pipe 1B and the axial center L of the through hole 10 are decentered and become eccentric as illustrated in FIG. 6B, since the inner seal area S1 and the outer seal area S2 do not overlap in the radial direction, the change in contact pressure and the internal stress of the inner and outer seal areas S1, S2 under an eccentric condition do not adversely affect, thereby keeping good sealing ability. In addition, as the outer circumferential projecting portion 51 is provided adjacent to the outer circumferential lip portion 31 in the pipe insertion direction so as to have a chevron-shaped section and to elastically contact the inner circumferential face 10a of the through hole 10, the outer circumferential projecting portion 51 certainly abuts on the inner circumferential face 10a of the through hole 10. The outer circumferential projecting portion 51 keeps the pipe 1B, which is apt to be eccentric as illustrated in FIG. 6B, at a correct position like the first embodiment illustrated in FIG. 4. Even when the pipe 1B is eccentric, the outer circumferential projecting portion 51 abuts on the inner circumferential face 10a of the through hole 10, inhibits excessive compression of the outer circumferential lip portion 31, and prevents adverse influence on the seal contact pressure of the outer circumferential lip portion 31, thereby keeping good sealing ability. In the gasket 3B of the third embodiment, the inner seal area S1 is arranged on the opposite side of the outer seal area S2 along the insertion direction of the pipe 1B, part of the outer circumferential face 30b corresponding to the position where the inner seal area S1 is formed is the flat portion 34, and the annular member 13 is fitted along the flat portion 34. Therefore, even when the pipe 1B is eccentric, the inner circumferential lip portions 32, 32 provided for the inner seal area S1 keep stable sealing ability.

The above-mentioned embodiments explain the pipe connection structure in which the second pipe 2 provided in the inverter case 100 for an automobile and the first pipe 1 provided outside of the inverter case 100 are connected by means of the gasket 3 and also explain the gasket 3 for use in the structure. The gasket is used for other pipe connection structures as far as the first pipe and the second pipe which are faced and separated in the axial direction are connected by means of the connection member. The structure of the gasket 3 is an example and is not limited to those illustrated in the figures; in addition, the number and shape (projection amount, projection width and so on) of the lip portion 42, the projecting portion 43, the outer circumferential lip portion 31, the inner circumferential lip portion 32, the inner circumferential projecting portion 33, the outer circumferential projecting portion 51 are not limited to those illustrated in the figures. The structure of the abutting portion 41ba and the dent portion 41c of the second holding portion 40 is not limited to those illustrated in the figures, the areas of the abutting portion 41ba and the dent portion 41c can be different, and the number of the abutting portions 41ba and the dent portions 41c is not required to be the same as the lip portions 42.

REFERENCE SIGNS LIST 100 inverter case
101 wall body
10 through hole
10a inner circumferential face
1 first pipe
1A, 1B pipe
1aa outer circumferential face
2 second pipe
3, 3A, 3B gasket
30 first holding portion
30b outer circumferential face
31 outer circumferential lip portion
40 second holding portion
50 joint portion
51 outer circumferential projecting portion

The invention claimed is:

1. A gasket for sealing a gap between a through hole formed on a wall body and a pipe to be inserted into the through hole, the gasket having a tubular portion to be provided for the pipe and made of tubular elastic material, the gasket comprising: an inner circumferential lip portion being provided so as to project from an inner circumferential surface of the tubular portion toward an inside of the tubular portion in a radial direction and elastically contacting an outer circumferential surface of the pipe; an annular outer circumferential lip portion being provided so as to project from an outer circumferential surface of the tubular portion toward an outside of the tubular portion in a radial direction and elastically contacting an inner circumferential surface of the through hole; wherein an inner seal area on an inner circumferential side where the inner circumferential lip portion is provided is located at a position so that the inner seal area does not overlap in a radial direction with an outer seal area of an outer circumferential side where the outer circumferential lip portion is provided, wherein the outer circumferential surface of the tubular portion corresponding to a region where the inner seal area is formed is configured to have a smaller diameter than a diameter of the through hole, wherein the outer circumferential surface of the tubular portion corresponding to a region where the inner seal area is comprises a flat portion, and wherein the outer circumferential lip portion is configured to be larger in diameter than the flat portion and the through hole, and the outer circumferential lip portion elastically contacts the inner circumferential surface of the through hole so as to form a gap between the flat portion and the inner circumferential surface of the through hole.

2. The gasket as set forth in claim 1,
wherein the inner seal area is located on an opposite side of the outer seal area along an insertion direction of the pipe; and
wherein an annular member is fitted onto the outer circumferential surface of the tubular portion corresponding to a region where the inner seal area is provided.

3. The gasket as set forth in claim 1, wherein an inner circumferential projecting portion is provided for the inner circumferential surface of the tubular portion adjacent to the inner circumferential lip portion and is provided corresponding to a region where the outer circumferential lip portion is provided.

4. The gasket as set forth in claim 1, wherein an outer circumferential projecting portion is provided adjacent to the outer circumferential lip portion along an insertion direction of the pipe.

5. The gasket as set forth in claim 1, wherein a projection amount of the inner circumferential lip portion is larger than a projection amount of the outer circumferential lip portion.

6. The gasket as set forth in claim 1, wherein a distance between the inner seal area and the outer seal area which do not overlap in the radial direction is equal to or larger than a projection amount of the inner circumferential lip portion.

7. The gasket as set forth in claim 1,
wherein one face of the outer circumferential lip portion opposite to an insertion direction of the pipe is in a linear manner and an other face is in a slant manner so as to be gradually narrowed toward a tip end portion, and
wherein a base portion of the outer circumferential lip portion of the one face has a bent portion which is a bending point when the outer circumferential lip portion elastically contacts the inner circumferential surface of the through hole.

8. The gasket as set forth in claim 7, wherein the bent portion is a cross point of the one face and a slant portion slanted from the outer circumferential surface of the tubular portion toward the one face.

9. The gasket as set forth in claim 1,
wherein the gasket is used as a connection member for connecting two pipes, and
wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

10. The gasket as set forth in claim 2,
wherein one face of the outer circumferential lip portion opposite to the insertion direction of the pipe is in a linear manner and an other face is in a slant manner so as to be gradually narrowed toward a tip end portion, and
wherein a base portion of the outer circumferential lip portion of the one face has a bent portion which is a bending point when the outer circumferential lip portion elastically contacts the inner circumferential surface of the through hole.

11. The gasket as set forth in claim 3,
wherein one face of the outer circumferential lip portion opposite to an insertion direction of the pipe is in a linear manner and an other face is in a slant manner so as to be gradually narrowed toward a tip end portion, and wherein a base portion of the outer circumferential lip portion of the one face has a bent portion which is a bending point when the outer circumferential lip portion elastically contacts the inner circumferential surface of the through hole.

12. The gasket as set forth in claim 4, wherein one face of the outer circumferential lip portion opposite to the insertion direction of the pipe is in a linear manner and an other face is in a slant manner so as to be gradually narrowed toward a tip end portion, and wherein a base portion of the outer circumferential lip portion of the one face has a bent portion which is a bending point when the outer circumferential lip portion elastically contacts the inner circumferential surface of the through hole.

13. The gasket as set forth in claim 6, wherein one face of the outer circumferential lip portion opposite to an insertion direction of the pipe is in a linear manner and an other face is in a slant manner so as to be gradually narrowed toward a tip end portion, and wherein a base portion of the outer circumferential lip portion of the one face has a bent portion which is a bending point when the outer circumferential lip portion elastically contacts the inner circumferential surface of the through hole.

14. The gasket as set forth in claim 2, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

15. The gasket as set forth in claim 3, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

16. The gasket as set forth in claim 4, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

17. The gasket as set forth in claim 6, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

18. The gasket as set forth in claim 1, wherein one face of the outer circumferential lip portion opposite to an insertion direction of the pipe is in a linear manner and an other face is in a slant manner so as to be gradually narrowed toward a tip end portion, wherein a base portion of the outer circumferential lip portion of the one face has a bent portion which is a bending point when the outer circumferential lip portion elastically contacts the inner circumferential surface of the through hole, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

19. The gasket as set forth in claim 1, wherein one face of the outer circumferential lip portion opposite to an insertion direction of the pipe is in a linear manner and an other face is in a slant manner so as to be gradually narrowed toward a tip end portion, wherein a base portion of the outer circumferential lip portion of the one face has a bent portion which is a bending point when the outer circumferential lip portion elastically contacts the inner circumferential surface of the through hole, wherein the bent portion is a cross point of the one face and a slant portion slanted from the outer circumferential surface of the tubular portion toward the one face, wherein the gasket is used as a connection member for connecting two pipes, and wherein the gasket has a first holding portion having the inner seal area and the outer seal area, the inner seal area is fitted onto one of the pipes and the outer seal area is fitted into the through hole; the gasket has a second holding portion which is fitted onto the other pipe; and the gasket has a joint portion for joining the first holding portion and the second holding portion.

* * * * *